United States Patent [19]

Jacobsen

[11] 4,105,573

[45] Aug. 8, 1978

[54] DISHWASHER DETERGENT COMPOSITION

[75] Inventor: Ronald Lowell Jacobsen, Wyoming, Ohio

[73] Assignee: The Procter & Gamble Company, Cincinnati, Ohio

[21] Appl. No.: 728,579

[22] Filed: Oct. 1, 1976

[51] Int. Cl.² ............................................. C11D 7/56
[52] U.S. Cl. ................................. 252/99; 252/89 R; 252/95; 252/103; 252/135; 252/187 R; 252/DIG. 1; 252/DIG. 15
[58] Field of Search ............... 252/99, 95, 89, DIG. 1, 252/DIG. 15, 171, 135, 103, 139, 140, 187

[56] References Cited

U.S. PATENT DOCUMENTS

| | | | |
|---|---|---|---|
| 3,351,558 | 11/1967 | Zimmerer | 252/137 |
| 3,549,539 | 12/1970 | Mallows | 252/99 |
| 3,630,923 | 12/1971 | Simmens et al. | 252/135 |
| 3,936,386 | 2/1976 | Corliss et al. | 252/99 |
| 3,956,199 | 5/1976 | Dawson et al. | 252/545 |
| 3,969,134 | 7/1976 | Batka et al. | 252/DIG. 1 |
| 3,994,818 | 11/1976 | van der Loo et al. | 252/DIG. 1 |

FOREIGN PATENT DOCUMENTS

| | | | |
|---|---|---|---|
| 1,119,884 | 6/1968 | United Kingdom | 252/540 |

*Primary Examiner*—Mayer Weinblatt
*Attorney, Agent, or Firm*—Robert B. Aylor; Richard C. Witte; Thomas H. O'Flaherty

[57] ABSTRACT

An automatic dishwasher detergent composition containing a random alkyl phosphonate soil-release agent and certain specific nonionic surfactants and a process for preparing said composition.

6 Claims, No Drawings

DISHWASHER DETERGENT COMPOSITION

BACKGROUND OF THE INVENTION

This invention relates to an automatic dishwasher detergent composition. Dishwasher detergent compositions generally contain alkaline builder salts including sodium silicate for its china protection ability, a chlorine bleach for the purpose of breaking up food particles into more soluble forms, and a water-soluble synethetic organic detergent for its cleaning and water-sheeting ability. Preferably such detergent compositions should be formulated with a relatively high alkaline pH in excess of about 8.5.

The alkaline builder salts are usually employed as a major component of the composition. This ingredient is the primary cleaning component and additionally may desirably possess the ability to sequester hardness imparting ions found in water. Although it may be possible to formulate detergent compositions without a sequestering builder salt, it is highly preferred to have a sequestering builder salt present.

Despite the excellent detergency benefits found in conventional automatic dishwasher detergent compositions, it is usually necessary to prepare dishes for the automatic dishwasher by scraping off some soils which adhere tightly to the dishes. Thus there has been a clear need for automatic dishwasher compositions either with improved cleaning ability or which incorporate a soil-release agent to permit the more ready removal of such tightly adhering soils.

Phosphorus-containing materials have been suggested for use as soil-release agents in dishwashing compositions and in machine dishwasher rinse aids. U.S. Pat. No. 3,941,713, Dawson et al (Mar. 2, 1976), discloses a rinse composition for machine dishwashing containing an organic phosphate.

Similar disclosures relating to dishwashing in general, and especially to dishwashing compositions containing organic phosphate and/or phosphate soil-release agents, can be found in South African patent application No. 72/03559 (corresponds to Netherlands patent application No. 7207017 and Canadian Pat. No. 969,832); British Pat. No. 1,395,031 (May 21, 1975); British Pat. No. 1,315,636 (May 2, 1973); U.S. Pat. No. 3,956,199, Dawson et al (May 11, 1976) and U.S. Pat. No. 3,963,635, Dawson et al (June 15, 1976).

Another disclosure of an organic phosphonate in an automatic dishwashing composition can be found in Belgian Pat. No. 819,982 (Mar. 17, 1975) and dishwashing with an aryl-polyoxyethylene phosphate is disclosed in U.S. Pat. No. 3,032,578, MacMullen et al (May 1, 1962).

The use of organic phosphates and phosphonates in detergent compositions in general is well known as can be seen from e.g., U.S. Pat. No. 3,294,693 (use as a hydrotrope); U.S. Pat. No. 3,957,661 (fabric softening); Belgian Pat. No. 802,004 (fabric softening); Belgian Pat. No. 835,803 (cosurfactant); German patent application No. 2,537,570 (foam suppressant); U.S. Pat. No. 3,869,412 (foam suppressant); Dutch patent application No. 73/04706; and U.S. Pat. No. 3,351,558 (corrosion inhibitor). All of these patents and applications are incorporated herein by reference.

Despite the many disclosures of the use of phosphours-containing surfactants in detergent compositions, especially dishwashing compositions, and more precisely, automatic dishwashing compositions, and the disclosure of the soil-release benefits which can be derived from using phosphorus-containing surfactants in dishwashing compositions, it has not been possible heretofore to formulate an automatic dishwashing composition having a pH >8.5 containing long chain random alkyl phosphonates as soil-release agents. The problem arises primarily from the presence of hardness ions in the water. Despite the presence of large amounts of sequestering builders the long chain alkyl phosphonates react with the hardness ions present to form an insoluble deposit which is very unsightly.

SUMMARY OF THE INVENTION

The present invention relates to an automatic dishwashing composition consisting essentially of:

(A) from about 10 to about 90% of alkaline detergency builder;

(B) from 0 to about 90% of inert filler material;

(C) from 0 to about 10% on an anhydrous basis of chlorine-yielding bleach;

(D) from about 0.1 to about 5% of random alkyl phosphonate wherein the alkyl chain contains from about 10 to about 24 carbon atoms;

(E) from about 1 to about 15% of surfactant selected from the group consisting of a condensation product of a fatty alcohol containing from 14 to 15 carbon atoms and from about 8 to about 10 moles of ethylene oxide per mole of alcohol; a condensation product of a fatty alcohol containing from 12 to 13 carbon atoms with from about 6 to about 12 moles of ethylene oxide per mole of alcohol; and mixtures thereof;

(F) from 0 to about 3% of water-soluble polycarboxylate resin; and (G) the balance being water or a low molecular weight water-soluble organic solvent, the pH of the composition at usage concentrations being from about 8.5 to about 11.

In this application, all parts, percentages and ratios are by weight unless otherwise specified.

DETAILED DESCRIPTION OF THE INVENTION

The random alkyl phosphonate anti-resoiling/soil-release agent of this invention is well known in the art as shown by the disclosure in U.S. Pat. No. 3,351,558, Zimmerer, said patent and the other patents disclosed hereinbefore being incorporated by reference. A preferred phosphonate is the random octadecane phosphonate. The random dodecane, tetradecane, and hexadecane phosphonates are operable but are somewhat less effective. The alkyl group may contain branching and/or unsaturation and mixtures of alkyl groups are acceptable and desirable. The sodium and potassium salts are preferred. The amount used is preferably from about 0.1 to about 5%, more preferably from about 0.5 to about 3%.

The nonionic surfactant is a key to the operability of this invention. It is critical that the specific nonionic surfactants disclosed herein be utilized since these specific surfactants minimize the harmful effects of hardness ions. It is believed that these specific surfactants solubilize the calcium and magnesium phosphonates, thereby preventing or minimizing the unsightly deposits while permitting soil-release benefits. The preferred surfactant is a condensation product of fatty alcohols containing 14 and/or 15 carbon atoms with about 9 moles of ethylene oxide per mole of alochol. This nonionic surfactant has less suds than the condensation product of a $C_{12}$ and/or $C_{13}$ fatty alcohol with about 6.5 moles of ethylene oxide per mole of fatty alcohol. The surfactant is preferably used at levels of from about 1 to about 15%, more preferably from about 4 to about 8%.

The above essential nonionic surfactants can be used either alone or in combination with other conventional surfactants of the prior art at a level of up to about 10%, preferably from about 1 to about 8%. Suitable conventional surfactants are disclosed in U.S. Published Patent Application No. B479,969, incorporated herein by reference. The essential nonionic surfactant should always be intimately mixed with the random alkyl phosphonate in ratios of from about 20:1 to about 1:5.

The alkaline detergency builder can be any of the known water-soluble organic and inorganic detergent builder ingredients including alkaline materials, sequestering agents, etc. Suitable inorganic builders include the orthophosphates, pyrophosphates, tripolyphosphates, carbonates, bicarbonates, hydroxides, and silicates, in their sodium and/or potassium forms. The alkaline detergency builders will normally include up to about 30% by weight of the total composition, preferably from about 4 to about 20%, of alkali metal silicate wherein the $SiO_2:M_2O$ ratio is from about 2.0 to about 3.2 and M is sodium and/or potassium. Other suitable inorganic detergency builders are disclosed in the patents and applications disclosed hereinbefore and incorporated herein. Water-insoluble builders such as the sodium aluminosilicates of Belgian Pat. No. 814,874 (Nov. 12, 1974), incorporated herein by reference can also be used.

Organic sequestering detergency builders include sodium and potassium citrates, nitrilotriacetates, ethylenediamine tetraacetates, oxydisuccinates, mellitates, etc. Other organic sequestering detergency builders are disclosed in the aforementioned patents and patent applications incorporated herein.

These alkaline detergency builders normally constitute the main cleaning component of automatic dishwashing compositions and thus are usually present in amounts from about 10 and up to about 90%.

Preferably these alkaline detergency builders are present in an amount of from about 20 to about 80%, more preferably from about 30 to about 70%.

The amount of alkaline detergency builder can be decreased by adding either inert filler materials such as sodium or potassium sufate, starch, etc. in amounts up to about 90%, preferably less than about 40%, and/or by adding water and/or a water-soluble organic solvent such as a short chain alcohol containing from about 1 to about 4 carbon atoms in amounts up to about 60% depending upon the physical form. The alcohol can be either monohydroxy, dihydroxy, trihydroxy, or tetrahydroxy and can be an alkanolamine such as mono-, di-, or triethanolamine. These inert filler materials and/or the solvents can replace a large portion of the alkaline builder salts.

The bleach component is a chlorine-yielding bleach. Such bleach is normally included in the composition at a level sufficient to give the detergent composition an available chlorine content of from about 0.5 to about 5%, preferably from about 0.7 to about 2%. As used herein the term, "available chlorine, " indicates the amount of chlorine in the composition which is equivalent to elemental chlorine in terms of oxidizing power. "Active chlorine" is often times used instead of "available chlorine." The same type of chlorine is designated by the two terms but when expressed quantitatively active chlorine indicates the chlorine actually present. The numerical value for available chlorine content is twice that for active chlorine. Available chlorine contents below about 0.5% fail to give proper cleaning performance and amounts in excess of about 5% do not result in any added cleaning ability. Any of the many known chlorine bleaches can be used in the present detergent composition. Examples of such bleach compounds are: chlorinated trisodium phosphate, dichlorocyanuric acid; salts of chlorine substituted cyanuric acid; 1,3-dichloro-5,5-dimethylhydantoin; N,N'-dichlorobenzoylene urea; paratoluene sulfodichloroamide; trichloromelamine; N-chloroammeline; N-chlorosuccinimide; N,N'-dichloroazodicarbonamide; N-chloroacetyl urea; N,N'-dichlorobiuret; chlorinated dicyandiamide, sodium hypochlorite; calcium hypochlorite; and lithium hypochlorite. The preferred bleach is an alkali metal salt of dichlorocyanuric acid, e.g. potassium or sodium dichlorocyanurates, or chlorinated trisodium phosphate.

Various minor ingredients may be present in the compositions of this invention including the suds suppressing additives disclosed in United States Published Patent Application No. B479,969, Maguire (Mar. 9, 1976), said Published Patent Application being incorporated herein by reference. Especially preferred suds suppressing additives and processes for introducing said additives into organic dishwashing compositions are disclosed in U.S. patent application Ser. No. 622,303, Gault et al filed Oct. 14, 1975, said application being incorporated herein by reference.

An optional ingredient is a soil suspending agent such as a polycarboxylate resin having a unit molecular weight of from about 150 to about 180. They may be naturally occuring or may be formed from unsaturated short-chain fatty acids such as maleic acid and, if desired, short-chain olefins such as ethylene. They may be used in amounts of from about 0.1 to about 2%, preferably from about 0.5 to about 1%.

The above Patent Applications also contain disclosures of other fillers and minor ingredients usable herein. The minor ingredients can be added to the compositions of this invention for their known purpose, e.g., china protecting agents, corrosion inhibitors, soil suspending ingredients, drainage promoting ingredients, dyes, perfumes, crystal modifiers, and the like.

The compositions can be liquid, pastes, or solids but are preferably in the form of small discrete particles which readily dissolve.

The advantages of this invention can be seen from the following examples.

In the following Tables 1–5, the automatic dishwashing base composition contains 31.5% sodium tripolyphosphate; 8.4% of a 50/50 mixture of 3.2 and 2.58 ratio sodium silicate solution (41% of solids), 0.8% sodium dichlorocyanurate; 10% chlorinated trisodium phosphate; 4% water; 7% of the indicated surfactant; 1.5% of a silicone suds suppressor (Dow's DB-544 a silica/dimethyl polysiloxane/siloxane resin self-emulsifying suds-suppressor containing a polyoxyethylene siloxane emulsifier); 3% of sodium random octadecane phosphonate; and the balance sodium sulfate. Testing was done by adding two 24 gram cups of the total compositions to a Kitchen Aid (Superba Model KDS-17) automatic dishwasher, and washing with 130° F city water containing approximately 8 to 9 grains per gallon hardness for one machine cycle. Forks made of No. 430 stainless steel (Adonis Utility Forks, American Stainless Company, USA) were included to evaluate insolubles deposition. Grading was on a 1 to 5 scale where 5 was equivalent to the best grade, that is to say having an essentially new appearance; 4 indicated a slight film but consumer acceptable; 3 indicated some film and borderline consumer's acceptance; 2 indicated a noticeable fim which was not acceptable; and 1 indicated a very heavy film which was completely unacceptable.

Unless otherwise indicated, the surfactant and the alkyl phosphonate were added by premixing them in water and taking an aliquot which was then added to the balance of the product mix.

TABLE 1

The following compositions were prepared in the laboratory and tested according to the indicated testing scheme. The results herein are the film grades.

|  | Surfactant | Film Grade |
|---|---|---|
| 1) | $C_{14-15}$ fatty alcohol polyethoxylate (9) | 3.5 |
| 2) | Tallow fatty alcohol polyethoxylate (9) | 1.0 |
| 3) | $C_{12-13}$ fatty alcohol polyethoxylate (6.5) | 3.5 |
| 4) | $C_{12-13}$ fatty alcohol polyethoxylate (11) | 4.3 |
| 5) | $C_{14-15}$ fatty alcohol polyethoxylate (7) | 2.0 |
| 6) | $C_{14-15}$ fatty alcohol polyethoxylate (11) | 2.3 |
| 7) | $C_{16-18}$ fatty alcohol polyethoxylate (9) | 2.0 |

TABLE 2

Even better film grades were obtained when the base composition was altered to contain more sodium tripolyphosphate (45.3% in place of 31.5%) with all other ingredients remaining the same except for the sodium sulfate which was reduced to compensate. Again 7% surfactant was used.

|  | Surfactant | Film Grade |
|---|---|---|
| 8) | $C_{14-15}$ fatty alcohol polyethoxylate | 4.5 |
| 9) | Tallow fatty alcohol polyethoxylate (9) | 1.5 |

TABLE 3

Using the same base composition as in Table 2 and raising the level of tallow fatty alcohol polyethoxylate (9) was also shown to be ineffective in improving the film grade.

|  | Surfactant | Film Grade |
|---|---|---|
| 10) | Composition 9 above | 1.5 |
| 11) | Composition 9 with surfactant increased to 15% | 1.5 |

TABLE 4

Using the base composition of Table 1 and reducing the sodium random octadecane phosphonate from 3 to 1.0% (sodium sulfate was added to compensate) gave similar results: In this test, two machine cycles were run before determing the film grade.

|  | Surfactant | Film Grade |
|---|---|---|
| 12) | $C_{14-15}$ fatty alcohol polyethoxylate (9) | 4.5 |
| 13) | Tallow fatty alcohol polyethoxylate (9) | 1.5 |

TABLE 5

In this table, using the base composition of Table 1, one can see the importance of premixing the surfactant and the alkyl phosphonate. The surfactant was $C_{14-15}$ fatty alcohol polyethoxylate (9).

|  | Composition | Film Grade |
|---|---|---|
| 14) | Surfactant and alkyl phosphonate added separately | 1.5 |
| 15) | Surfactant and alkyl phosphonate premixed | 3.5 |

This data exemplifies the process form of this invention in which the phosphonate and the surfactant are mixed thoroughly together prior to adding them to the remainder of the composition.

EXAMPLES

| Form | 15 Granule | 16 Paste | 17 Granule | 18 Granule |
|---|---|---|---|---|
| Sodium tripolyphosphate | 45.3 | — | 25.0 | — |
| Sodium nitrilotriacetate | — | 37.0 | — | — |
| Sodium citrate | — | — | — | 20.0 |
| Sodium carbonate | — | 15.3 | 20.0 | — |
| Chlorinated trisodium phosphate-hydrated | 18.2 | — | — | — |
| Sodium dichlorocyanurate dihydrate | — | — | 2.0 | 2.0 |
| Triethanolamine | — | 20.0 | — | — |
| $Na_2SO_4$ | — | — | 6.5 | 20.4 |
| $NaHCO_3$ | — | — | — | 20.0 |
| Potassium sesquicarbonate | — | — | 10.0 | — |
| 2.4R sodium silicate solution | 30.0 | — | 30.0 | 25.0 |
| 2.0R anhydrous sodium silicate | — | 20.0 | — | — |
| Sodium random tetradecane phosphonate | 1.0 | — | — | — |
| Potassium random hexadecane phosphonate | — | — | — | 3.0 |
| Sodium random octadecane phosphonate | — | 2.0 | 1.0 | — |
| $C_{14-15}$ alcohol polyethoxylate (9) | 2.5 | 5.0 | — | 7.5 |
| $C_{12-13}$ alcohol polyethoxylate (6.5) | — | — | 1.5 | — |
| Tallow alcohol polyethoxylate (9) | — | — | 3.5 | — |
| Triton CF-54* (polyethoxylated adduct) | 2.5 | — | — | — |
| Silicone suds suppressor (Dow DB-544) | .4 | 0.6 | .4 | 1.0 |
| Dispersant (Gantrez AN-119)** | — | — | — | 1.0 |
| Perfume | .1 | .1 | .1 | .1 |
|  | 100 | 100 | 100 | 100 |

*Rohm & Haas Co.
**GAF Corp.

The above examples all provide improved anti-resoiling/soil release as compared to the same compositions without the random alkyl phosphonates and have acceptable film grades.

What is claimed is:

1. An automatic dishwashing composition consisting essentially of:
   (a) from about 10 to about 90% by weight of alkaline detergency builders selected from the group consisting of sodium and potassium, orthophosphates, pyrophosphates, tripolyphosphates, carbonates, bicarbonates, hydroxides, silicates, water insoluble aluminosilicates, citrates, nitrilotriacetates, ethylenediamintetraacetates, oxydisuccinates, and mellitates;
   (b) from 0 to about 90% by weight of an inert filler material selected from the group consisting of sodium sulfate, potassium sulfate, and starch;
   (c) from 0 to about 10% by weight of chlorine-yielding bleach on an anhydrous basis selected from the group consisting of sodium and potassium dichlorocyanurates and chlorinated trisodium phosphate;
   (d) from about 0.1 to about 5% by weight of sodium or potassium random alkyl phosphonate wherein the alkyl chain contains from about 10 to 24 carbon atoms;
   (e) from about 1 to about 15% by weight of a surfactant selected from the group consisting of a condensation product of fatty alcohol containing from 14 to 15 carbon atoms and from about 8 to 10 moles of ethylene oxide per mole of alcohol; condensation product of fatty alcohol containing from 12 to 13 carbon atoms with from about 6 to about 12 moles of ethylene oxide per mole of alcohol; and mixtures thereof;
   (f) up to about 60% by weight water or low molecular weight water-soluble organic solvent, which is a short chain alcohol containing from about 1 to about 4 carbon atoms the pH of the composition at usage concentrations being from 8.5 to about 11 said automatic dishwashing composition being prepared by a process wherein components (d) and (e) are thoroughly premixed prior to adding these ingredients to the remainder of the composition.

2. The composition of claim 1 containing from about 0.5 to about 3% by weight of said random alkyl phosphonate.

3. The composition of claim 1 wherein the random alkyl phosphonate is random octadecane phosphonate.

4. The composition of claim 3 wherein the surfactant is a condensation product of fatty alcohol containing from 14 to 15 carbon atoms and from about 8 to about 10 moles of ethylene oxide per mole of alcohol.

5. The composition of claim 1 wherein the surfactant is a condensation product of fatty alcohol containing from 12 to 13 carbon atoms and from about 6 to about 12 moles of ethylene oxide per mole of alcohol.

6. The composition of claim 5 wherein the surfactant is present in an amount of from about 4 to 8% by weight.

* * * * *